(12) United States Patent
Dyson et al.

(10) Patent No.: US 9,090,486 B2
(45) Date of Patent: Jul. 28, 2015

(54) SOLAR ENCLOSURE FOR WATER REUSE

(75) Inventors: Anna Dyson, Troy, NY (US); Jason Vollen, Brooklyn, NY (US); Mark Mistur, Troy, NY (US); Peter Stark, Brooklyn, NY (US); Kristin Malone, Brooklyn, NY (US); Matt Gindlesparger, Philadelphia, PA (US)

(73) Assignee: Rensselaer Polytechnic Institute, Troy, NY (US)

( * ) Notice: Subject to any disclaimer, the term of this patent is extended or adjusted under 35 U.S.C. 154(b) by 655 days.

(21) Appl. No.: 13/307,442

(22) Filed: Nov. 30, 2011
(Under 37 CFR 1.47)

(65) Prior Publication Data

US 2012/0234771 A1    Sep. 20, 2012

Related U.S. Application Data

(60) Provisional application No. 61/418,937, filed on Dec. 2, 2010.

(51) Int. Cl.
  *C02F 1/30* (2006.01)
  *C02F 1/14* (2006.01)
  *F24J 2/04* (2006.01)

(52) U.S. Cl.
  CPC . *C02F 1/14* (2013.01); *F24J 2/0444* (2013.01)

(58) Field of Classification Search
  USPC ............... 210/748.01, 748.09, 153; 202/234; 60/641.15; 126/561, 569, 583, 698
  See application file for complete search history.

(56) References Cited

U.S. PATENT DOCUMENTS

| 4,237,861 A |  | 12/1980 | Fayard et al. |  |
| 4,273,106 A |  | 6/1981 | Gould |  |
| 4,314,544 A | * | 2/1982 | Muller et al. | 126/713 |
| 4,323,052 A | * | 4/1982 | Stark | 126/571 |
| 7,190,531 B2 |  | 3/2007 | Dyson |  |
| 7,745,723 B2 |  | 6/2010 | Dyson |  |
| 2009/0222981 A1 |  | 9/2009 | Hartman |  |
| 2010/0192944 A1 | * | 8/2010 | Gruber | 126/698 |

OTHER PUBLICATIONS

International Search Report for PCT International Application No. PCT/US2011/062511 mailed Jul. 9, 2012.

\* cited by examiner

*Primary Examiner* — Walter D Griffin
*Assistant Examiner* — Cameron J Allen
(74) *Attorney, Agent, or Firm* — RatnerPrestia

(57) ABSTRACT

A system and method for treating wastewater using concentrated solar energy are described herein. The system includes a lens that is positioned either on or adjacent, or forms part of a façade of a building. A fluid passageway, through which the wastewater is circulated, is positioned either within or adjacent the lens. The lens is configured to direct solar energy onto the wastewater to treat the wastewater.

21 Claims, 18 Drawing Sheets

SOLAR ENCLOSURE FOR WATER REUSE

CROSS-REFERENCE TO RELATED APPLICATIONS

This application is a non-provisional patent application that claims priority to U.S. Provisional Patent Application No. 61/418,937, filed Dec. 2, 2010, the contents of which are incorporated by reference herein in their entirety.

FIELD OF THE INVENTION

The invention is directed to a water treatment system that is integrated with the façade of a building.

BACKGROUND OF THE INVENTION

Across all populated localities, water is the most essential resource needed to protect socio-economic development, robust ecosystems, and well being for all forms of life. Accordingly, in built and natural environments, multiple scales of water infrastructure have been predicated upon methods to manage, supply, circulate, and eliminate water supplies in congruence with demands for water. In buildings, these infrastructures unreservedly channel water through distribution networks, not only as the material to support biophysical life, but also as the transfer medium for thermic capture and transport through mechanical systems to manage heating and cooling loads. Coincidentally, water and energy consumption are inextricably linked, as every measure of management in water distribution requires a variety of energy infusions.

Increasingly throughout the modern era, the benefits of water management and distribution in buildings have become evident through the advent of purification methods and flow technologies, which advanced the circumstances of human health and experiences of comfort across broad cultural spectrums. The future conditions of water resources are insecure, however, particularly because of water scarcity, which is exacerbated by projected population growth patterns, industrial development, rising living standards, and increasing large-scale urbanization. Today's market offers a broad range of solutions to low-tech water recycling and non-tracking thermal energy production for the built environment. Examples of such current solutions include flat plate collectors, evacuated tubes, air collectors, Integral Collector Storage (ICS) Thermosiphons, and so forth. Nevertheless, there exists a need to integrate water recycling and thermal energy production systems with architecture because those current solutions do not address design performance criteria. Additionally, those current solutions are limited in terms of optimization in orientation, concentration possibilities, and energy losses due to refraction of solar radiation.

SUMMARY OF THE INVENTION

A Solar Enclosure for Water Reuse (SEWR) system is a building facade-integrated solar absorption strategy for a hybrid-interconnected system of daylighting strategies, on-site water recovery, and thermal modulation that reduces energy and water consumption profiles associated with conventional building systems. An exemplary SEWR system invention encompasses multiple embodiments of a façade modular geometry that is systemically connected with building-scale multi-barrier biomechanical water treatment systems and multiple thermal modulation systems. Thermal modulation systems include hydronic systems, which include but are not limited to thermal storage, absorption cooling, commercial hot water, domestic hot water, and radiant heating/cooling systems. This allows the system to synergistically provide closed-loop recycled water and thermal energy for building use.

The SEWR system incorporates measures of diffuse irradiance and direct solar insolation to establish the effectiveness of the system. Insolation is a measure of solar radiation energy. Diffuse irradiance refers to all the solar radiation coming from the sky except for solar radiation coming directly from the sun and the circumsolar irradiance within approximately three degrees of the sun.

The SEWR system also functions as an advanced solar collector on account that it overcomes existing impediments of reflection off vertical surfaces. The exterior profile of individual SEWR modules that comprise the SEWR system embodies multidirectional collector aperture areas to absorb direct and diffuse radiation at opportune times of the day. The exterior profile of the SEWR module is, for example, a slumped glass pane, a cast glass block, or a curtain wall assembly. The result is a substantial increase of heat input into the SEWR system, as compared to larger vertical collector areas on conventional solar collection technologies.

Furthermore, the collector aperture areas integrate optics to increase the incident solar acceptance angles and to achieve solar concentration ratios higher than one. Optical concentration is utilized to attain preferred transfer fluid temperatures in preferred time periods in consideration of achieving solar pasteurization, disinfection, desalination, or viral inactivation as a water treatment goal of the transfer fluid. Optical concentration elements include micro optics, thin films, or surface articulation/simple lensing, the selection of which depends on which lens type is most advantageous in terms of system performance criteria. Micro optic elements include but are not limited to fly eye type geometries, mosaic lenses, pillow lenses, TIR-types, OPC collectors, GRIN lenses, etc., as are discussed in further detail with reference to FIG. 3.

Insulation against thermal losses is conceptualized as having transparent, translucent, or opaque qualities in accordance with desired building design criteria. Examples of insulation include, but are not limited to, transparent insulation, light scattering materials, evacuated voids, or opaque materials.

The SEWR system comprises a plurality of linked SEWR modules that are distributed as a building envelope or free-standing wall. Integrating and distributing the modules across a building surface may achieve several advantages compared to existing solar collector technologies located on buildings. For example, the larger surface areas of facades are more suitably matched for expected solar energy requirements in large buildings over the smaller surface area of roofs. Thus, the system could output treated greywater or freshwater and thermal energy to match large building requirements. Also, a distributed module system can be deployed as an extensive or interspersed building envelope strategy, performing as a daylight diffuser or exterior.

In addition to solar water treatment on building facades, the SEWR module introduces modular based geometric design technologies enabling the system to be flexible enough for installation in multiple building types, with various spatial limitations. Complimenting the geometric flexibility, the system is also highly scalable, allowing it to operate in range of building applications. Module fabrication could be executed through digital slumping or casting methods.

Generally, a primary approach to alleviating water shortages involves reducing overall programmatic demand for potable water by utilizing treated, reclaimed wastewater which is less energy intensive, for non-potable applications which do not require a higher level water source, such as toilet flushing, irrigation, building system heat transfer medium, environmental enhancement, and sanitation. Municipalities could better manage water flows with smaller, decentralized distribution systems, reducing the length of transit from source to consumer, and therefore reducing the incidents of water loss through leakage and reducing the embodied energy required to distribute water. In urban areas, the conversion from centralized distribution of water to decentralized, presents the opportunity for innovative methods in solar water treatment on vertical building envelopes, especially because typical on-site water treatment systems require substantial horizontal area, which is not likely to be highly available in the particular context. A decentralized pattern of water distribution affords a shift toward new methods in water resource management from nontraditional technologies and supports implementation of SEWR strategies. In this scenario, decentralized urban buildings could operate as off-grid water treatment centers for the surrounding buildings.

BRIEF DESCRIPTION OF THE DRAWING FIGURES

DETAILED DESCRIPTION OF THE DRAWING FIGURES

Figure 1:
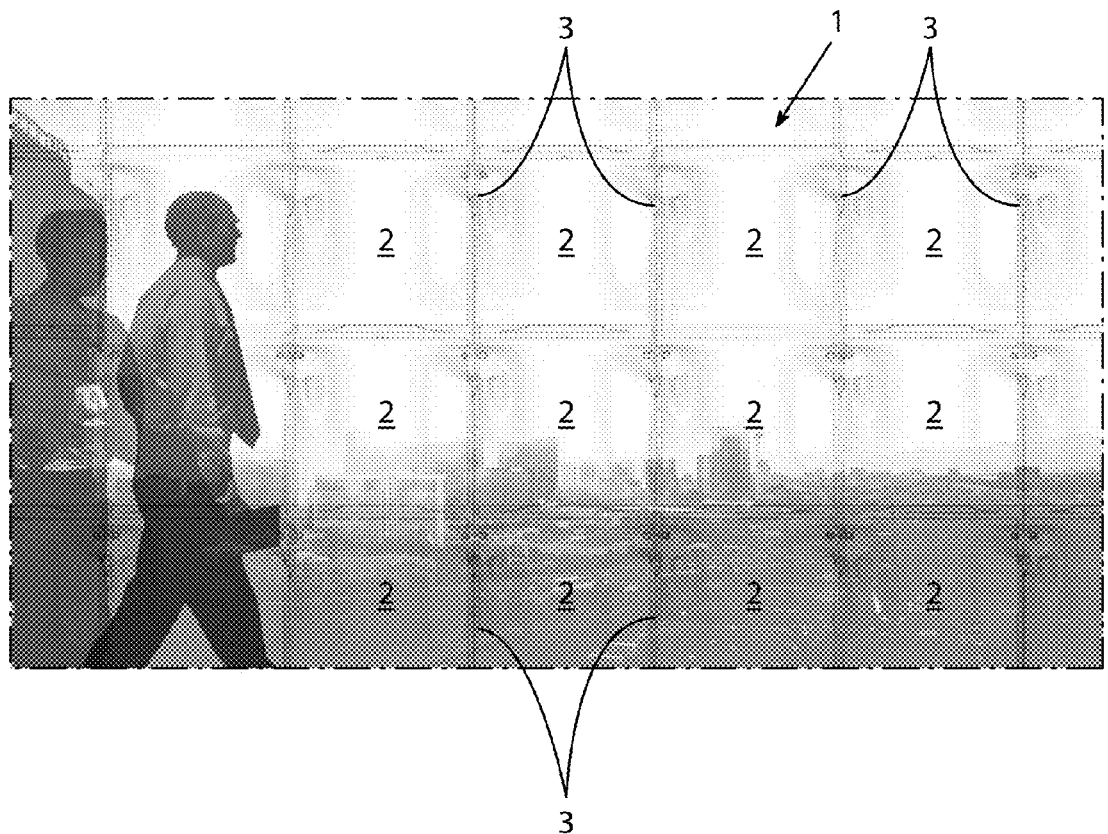
FIG. 1 is a rendering of a Solar Enclosure for Water Reuse (SEWR) system applied to a building facade, according to one exemplary embodiment of the invention, as viewed from the interior of the building.

FIG. 1 depicts a rendering of a Solar Enclosure for Water Reuse (SEWR) system 1 that forms at least a part of a building facade, according to one exemplary embodiment of the invention, as viewed from the interior of the building.

As will be described in the figures that follow, the SEWR system 1 pairs the operations of an innovative pasteurization/disinfection/desalination system with a building's water resources to offset the water supply demands and thermal energy requirements of the building. The SEWR system 1 is configured to accomplish daylighting, on-site water recovery, and thermal modulation in an effort to reduce energy and water consumption associated with conventional building systems. Daylighting refers to the practice of placing windows and reflective surfaces within a building or other structure so that natural light provides effective internal lighting during daylight hours.

More specifically, as best shown in FIG. 1, the SEWR system 1 generally includes a modulating façade composed of an arrangement of SEWR modules 2 that at least partially form a building façade. The modulating façade is configured to harness solar energy to accomplish daylighting, on-site water recovery, and thermal modulation. The modulating façade is a passive non-tracking system, which is comprised of optical concentrators that are configured to achieve maximum solar absorption. The optical concentrators are formed into volumetric building facade elements that are geometrically shaped to interface and concentrate incident solar energy.

The SEWR system 1 includes fluid transfer structures 3 which are configured to contain greywater, actively transfer thermal energy to the greywater via the modulating façade, circulate the greywater, and direct the greywater water to thermal storage and/or thermal applications. Greywater is wastewater generated from domestic activities such as laundry, dishwashing, and bathing. Greywater differs from water from toilets which is designated sewage or blackwater. The SEWR system 1 may also be configured to treat blackwater. The fluid transfer structures 3 of the SEWR system 1 are configured to be connected to a building system's infrastructure to provide on-site water treatment. The system distributes solar treated water to various points of use in the building, in an effort to significantly offset demands for off-site water supplies, as well as offset the thermal energy requirements of the building.

The SEWR system 1 is designed for disassembly, thereby allowing for recovery of parts and materials to maximize overall economic value and minimize environmental impacts in the end-of-life of the product. By recovering water on-site, the SEWR system 1 significantly offsets building resource requirements for water and thermal energy and lowers the HVAC energy profile of the building while simultaneously providing a building envelope system and diffusing daylight conditions.

Figure 2:
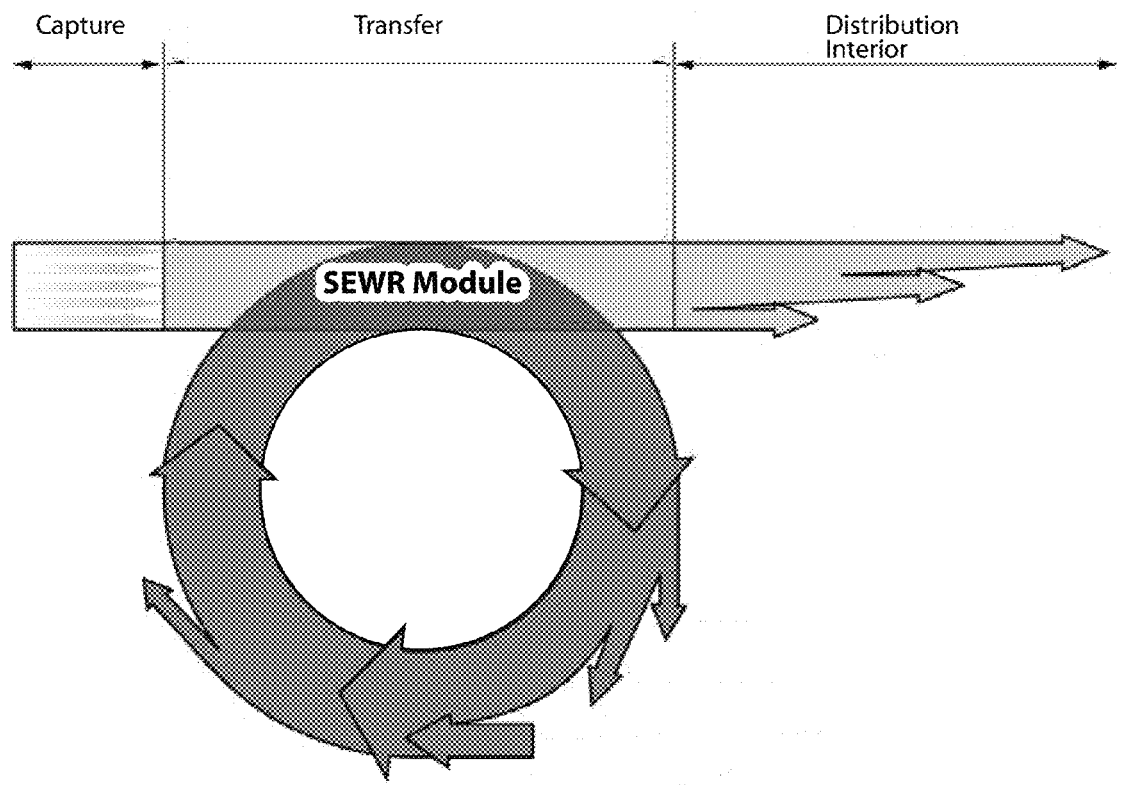
FIG. 2 is a block diagram depicting the intersection of a heat transfer process and a water treatment cycle of the SEWR system.

FIG. 2 is a block diagram depicting the intersection of the heat transfer process and the water treatment cycle of the SEWR system. The heat transfer process of the SEWR system encompasses three phases, namely, thermal energy capture, thermal energy transfer and thermal energy distribution. In the 'capture' phase of the heat transfer process, the façade of the SEWR system captures solar energy. In the 'transfer' phase of the heat transfer process, the façade of the SEWR system modulates the daylight and transfers the solar energy to the building's greywater to reduce solar heat gains on the building façade. The multi-directional collector surfaces of the façade and the fluid transfer structures of the SEWR system are instrumental in accomplishing the 'transfer' phase of the heat transfer process. In the 'distribution' phase of the heat transfer process, which is depicted by the straight arrows, the heated water is distributed to various points of use within the building to displace or offset water usage from offsite resources, and the solar energy is distributed throughout the building. A point of use in the building may be a high temperature heat application (such as a boiler), a mid temperature heat application (such as a hot water faucet) or a low temperature heat application (such as a cold water faucet). Distributing solar energy throughout the building provides natural lighting and warmth to the interior of the building, while reducing lighting, electrical and cooling loads.

The water treatment cycle of the SEWR system, which is depicted by the circular arrows, encompasses three phases, namely, water collection, water treatment and water distribution. In the water collection phase, greywater and/or blackwater is collected from indoor points of use within the building. The greywater supply may be supplemented by a municipal water supply. The blackwater is filtered from the greywater supply during the collection phase. In the water treatment phase, the SEWR system employs a pasteurization, disinfection and/or desalination process to treat the greywater. The multi-directional collector surfaces of the façade and the fluid transfer structures of the SEWR system are instrumental in accomplishing the water treatment phase of the water treatment cycle. As best shown in FIG. 2, the water treatment phase of the water treatment cycle intersects the 'transfer' phase of the heat transfer process. In the water distribution phase of the water treatment cycle, the treated greywater may be distributed to various points of use or storage locations that are either inside or outside of the building.

Figure 3:
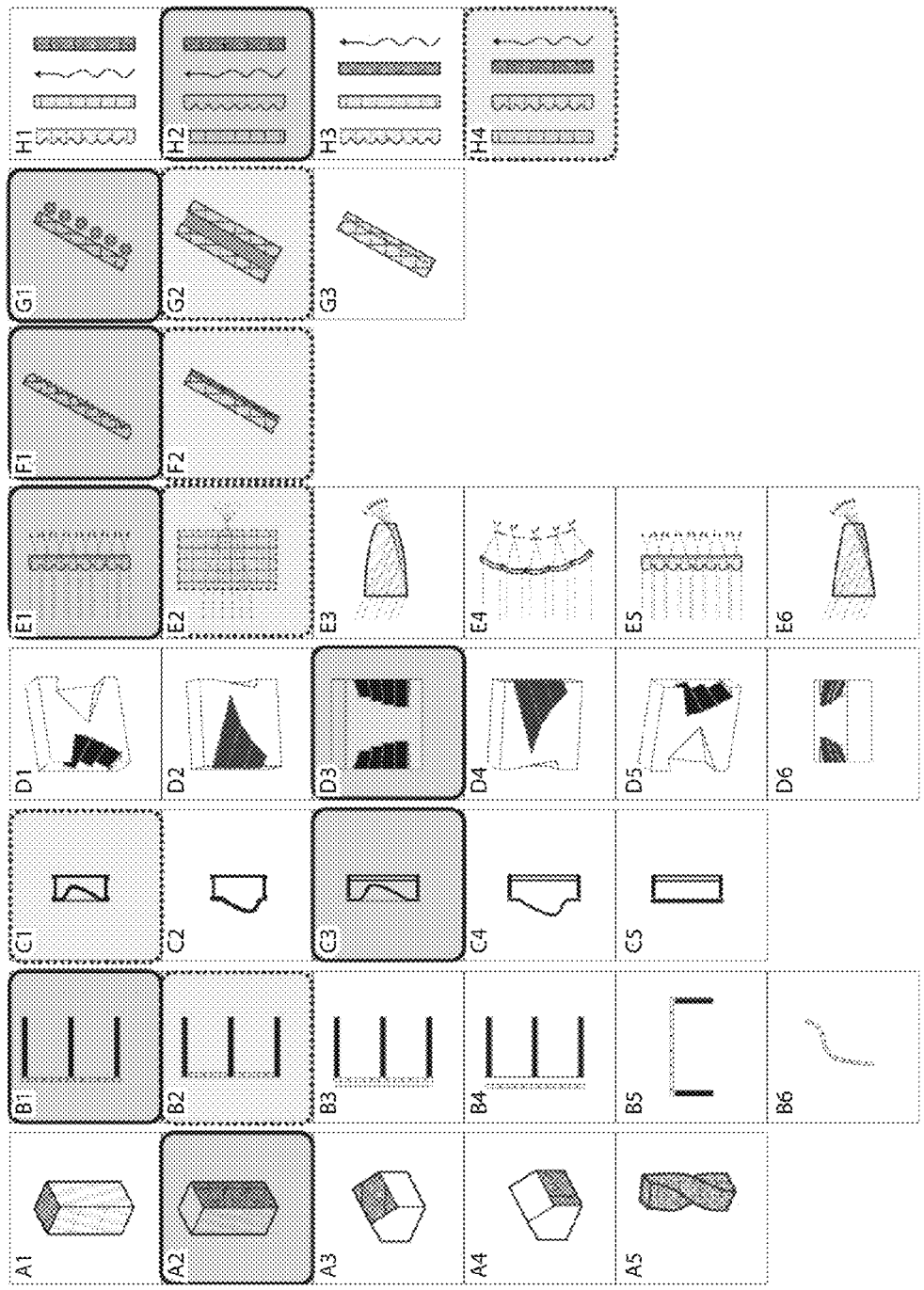
FIG. 3 depicts a matrix of component parts, assemblies and methodologies that are selectively combined to form an SEWR system.

FIG. 3 depicts a matrix of component parts, assemblies and methodologies that are selectively combined to form an SEWR system. It should be understood that the invention is not limited to the component parts, assemblies and methodologies depicted in FIG. 3, as other component parts, assemblies and methodologies may be utilized without departing from the scope or spirit of the invention. The columns of FIG. 3 will now be discussed starting from the top row of the first and left-most column and ending with the bottom row of the eight and right-most column.

The first and left-most column of FIG. 3 depicts five different building typologies onto which the SEWR system may be integrated or employed, namely, multi-unit horizontal, multi-unit vertical, single unit roof, single unit vertical, and global geometry (labeled A1 through A5, respectively). The building typologies may vary from that which is shown and described. In typologies A1 and A3, the SEWR system is mounted to the roof of a building. In typologies A2 and A4, the SEWR system is mounted to a side wall of a building. In typology A5, the SEWR system is mounted to any or all of the exterior facing surfaces of a building.

The second column of FIG. 3 depicts six different wall typologies for an SEWR system, which are shown schematically in cross-section, namely, a non-load bearing curtain wall, a load bearing wall, a double skin wall, a rain screen, a roof and a free standing structure (labeled B1 through B6, respectively). These terms should be understood by one of ordinary skill in the art. The small rectangles that are shown in B1-B6 represent individual SEWR modules, which form a wall or roof.

In wall typology B1, the SEWR modules are stacked to form a vertical wall that is mounted to the beams of a building in a non-load bearing fashion. In wall typology B2, the SEWR modules form a vertical wall that is mounted between the beams of a building in a load bearing fashion. In wall typology B3, the SEWR modules form a vertical wall that is mounted to the beams of a building in a non load bearing fashion, and a separate vertical skin is positioned on the exterior facing surface of the wall of SEWR modules. In wall typology B4, the SEWR modules form a vertical wall, and that vertical wall is separated from the exterior wall of the building by a pre-defined gap. The vertical wall essentially constitutes a rain screen on the outside of the building. In wall typology B5, the SEWR modules form a horizontal wall that is mounted to the top end of the beams of a building to form a roof. In wall typology B6, the SEWR modules form a free-standing wall that not limited by any particular shape or configuration.

It should be understood that each wall typology B1-B6 may be incorporated into any of the building typologies A1-A5 of the first column of FIG. 3 either with or without modification (with the exception of the wall typology B5 which is not intended for building typologies A2 and A4). Also, the wall typologies may vary from that which is shown and described without departing from the scope or spirit of the invention.

Five different SEWR modules are shown in cross-section in the third column of FIG. 3 (labeled C1-C5). Each SEWR module comprises a unitary glass block (see C1 and C2) or a series of interconnected panes or panels known as an insulating glazing unit (IGU) (see C3-C5, which are referred to in the third column of FIG. 3 as a 'hybrid' or 'IGU'). An insulating glazing unit (IGU), which may also be referred to in the art as an insulating glass unit, is an assembly in which glass panes are held by means of adhesive in desired relation to a separator frame defining a dead air space between the panes and in which a channel around the periphery of the assembly is filled with a sealant material.

The outermost exterior facing panel, pane or portion of each SEWR module is referred to hereinafter as a transparent or translucent lens. At least a portion of the lens may have a non-linear shape. The third column of FIG. 3 depicts five different exemplary configurations of an SEWR module, namely, concave, convex, hybrid concave, hybrid convex and insulated glazing unit (IGU) (labeled C1 through C5, respectively).

In configuration C1, the lens of the unitary glass block has a concave shape. In configuration C2, the lens of the unitary glass block has a convex shape. In configuration C3, the lens of the hybrid SEWR module has a concave shape. In configuration C4, the lens of the hybrid SEWR module has a convex shape. In configurations C5, the lens of the module is flat. Each SEWR module C1-C6 may be incorporated into any of the wall typologies B1-B6 of the second column of FIG. 3. Also, the SEWR modules may vary from that which is shown and described.

The lens of an SEWR module is fixed in place, and is, therefore, not configured to track the movement of the sun. With that in mind, the solar capture profile of the lens of an SEWR module is uniquely adapted to capture a maximum amount of the solar energy that is produced by the sun. The solar capture profile of a lens differs depending upon the which cardinal direction the lens face once it is mounted to a building. Thus, an end-user may select the appropriate lens solar capture profile depending upon which cardinal direction the lens will be facing. The fourth column of FIG. 3 depicts six different solar capture profiles for an SEWR module, namely, east orientation, south-east orientation, south orientation, south-west orientation, west orientation and horizontal orientation (labeled D1 through D6, respectively). Solar capture profiles D1-D5 may be incorporated into the wall typologies B1-B4 and B6 of the second column of FIG. 3. The horizontal capture profile D6 is applicable to the roof wall typology B5 and the free standing wall typology B6 of the second column of FIG. 3.

Referring now to the fifth column of FIG. 3, an SEWR module embodies multidirectional collector aperture areas to absorb direct and diffuse radiation. The collector aperture areas integrate optics, which are referred to hereinafter as optical concentration elements, to increase the incident solar acceptance angles and to achieve solar concentration ratios higher than one. Optical concentration is utilized to attain preferred transfer fluid temperatures in preferred time periods in consideration of achieving solar pasteurization, disinfection, desalination, or viral inactivation as a water treatment goal of the transfer fluid.

Optical concentration elements include micro optics, thin films, or surface articulation/simple lensing, the selection of which depends on which lens type is most advantageous in terms of system performance criteria. More particularly, the fifth column of FIG. 3 depicts six different optical concentration elements, which are shown schematically in cross-section, namely, a pillow lens, a gradient index (GRIN) film, a compound parabolic concentrator, a fly's eye optic, a mosaic lens and a total internal reflecting (TIR) lens (labeled E1 through E6, respectively). The optical concentration elements shown in FIG. 3 increase the incident solar acceptance angles to achieve solar concentration ratios greater than one. Those skilled in the art will recognize the purpose of each optical concentration element depicted in the fifth column. The optical concentration elements E1-E6 may apply to any SEWR module C1-C5 that is shown in the third column of FIG. 3. Also, the optical concentration elements may vary from that which is shown and described.

The sixth column of FIG. 3 depicts two different methods (F1 and F2) for fabricating a lens assembly comprising a lens and a concentration element. The lens assemblies are shown schematically in cross-section. In method F1, the concentration element is integrated with the lens. In method F2, the concentration element is applied, e.g., adhered, fastened mounted or coupled, to the lens. The fabrication methods F1 and F2 may apply to any of the SEWR modules C1-C5 that are shown in the third column of FIG. 3. Also, the fabrication methods may vary from that which is shown and described.

The seventh column of FIG. 3 depicts three different methods for transporting water relative to a lens of an SEWR module. The methods are shown schematically in cross-section. In water transport method G1, water is transported through water-carrying conduits that are positioned adjacent an interior facing surface of a lens of an SEWR module. In water transport method G2, water is transported through a single water-carrying channel that is embedded within a lens or disposed between two adjacent panels. In water transport method G3, water is transported through a plurality of water carrying micro-channels that are embedded within a lens. The water transport methods G1-G3 may apply to any SEWR module C1-C5 that is shown in the third column of FIG. 3. Also, the water transport methods may vary from that which is shown and described. The tubes, conduits or channels for carrying water shown in the seventh column of FIG. 3 may be located at the focal point of the lens.

The eighth and right-most column of FIG. 3 depicts four different heat transfer assemblies that are shown schematically in cross-section (labeled H1 through H4, respectively). Each heat transfer assembly in the eighth column of FIG. 3 comprises a lens (labeled solar profile), an optical concentration element (labeled concentration) for concentrating thermal energy, a thermal energy absorber (labeled absorption) that absorbs the concentrated thermal energy, and a heat transfer fluid (e.g., water) that exchanges thermal energy with the thermal energy absorber. The thermal energy absorber may be a conduit in which the heat transfer fluid is carried, or a panel or wall that is positioned in physical contact with the heat transfer fluid.

In the top-most heat transfer assembly of FIG. 3 (labeled assembly H1), the optical concentration element is positioned on the exterior-facing surface of the lens (note exterior and interior arrows), and the heat transfer fluid is distributed between the interior facing surface of the lens and the exterior facing surface of a thermal energy absorber. In operation, the concentrated thermal energy is transmitted through the heat transfer fluid to heat the heat absorber, and the heated absorber, in turn, heats the heat transfer fluid.

The heat transfer assembly labeled assembly H2 differs from the assembly labeled H1 in that the optical concentration element of assembly H2 is positioned on the interior-facing surface of the lens. Assembly H2 will be discussed in greater detail with reference to FIGS. 8 and 9.

The heat transfer assembly labeled assembly H3 differs from the assembly labeled H1 in that thermal energy absorber of assembly H3 is positioned adjacent the interior-facing surface of the optical concentration element. In operation, the concentrated thermal energy is transmitted directly to the heat absorber of assembly H3, and the heated absorber, in turn, heats the heat transfer fluid.

The heat transfer assembly labeled assembly H4 differs from the assembly labeled H2 in that thermal energy absorber of assembly H4 is positioned adjacent the interior-facing surface of the optical concentration element. Assembly H4 will be discussed in greater detail with reference to FIGS. 10 and 11. The heat transfer assemblies H1-H4 may apply to any SEWR module C1-C5 that is shown in the third column of FIG. 3. Also, the heat transfer assemblies may vary from that which is shown and described.

Figure 4:
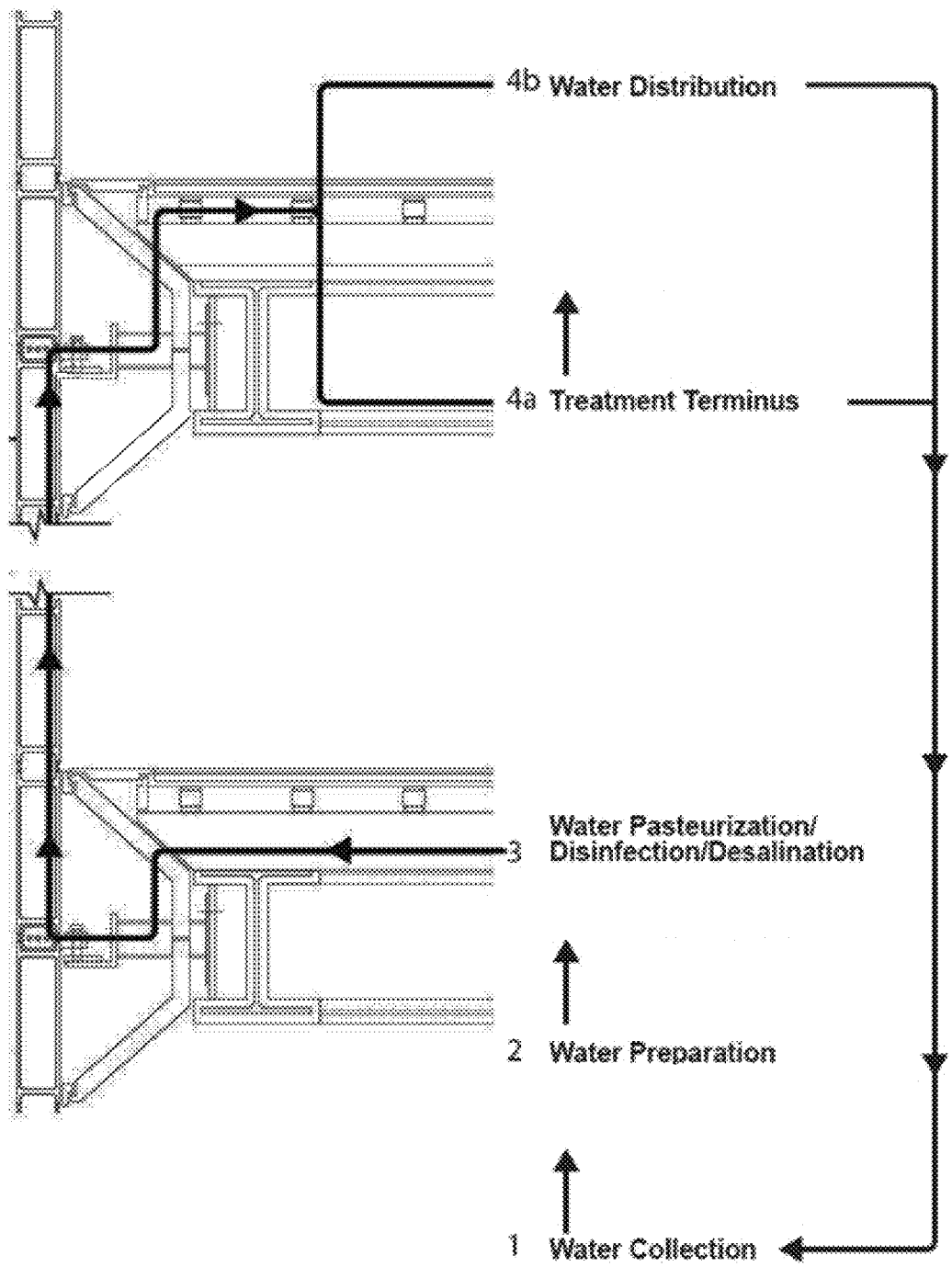
FIG. 4 is a schematic view of the flow path of water through an SEWR system that is incorporated into a façade of a building.

FIG. 4 is a schematic view of the flow path of water through an SEWR system that is incorporated into a façade of a building. The SEWR system and the building that are shown in FIG. 4 encompass the following elements from FIG. 3: building typology A2, wall typology B1, SEWR module type C1, solar capture profile D3, concentration element E5, fabrication method F4, and water transport method G2. It should be understood that those elements of FIG. 3 may vary.

As best shown in FIG. 4, water cycles through stages 1 through 4B. During the water collection stage (labeled 1), greywater is recovered from points of use, such as faucets, baths, kitchens, cooling systems, laundry and toilets. During the initial water preparation stage (labeled 2), contaminants in the greywater are removed by sedimentation, screening, filtering and so forth.

During the water treatment stage (labeled 3), the greywater is distributed through the water channels of the SEWR modules. The greywater water is heated by the heat absorbers (not shown) of the SEWR modules which are exposed to direct solar radiation and reflected solar radiation. In concert with the water treatment stage, the SEWR modules interrupt the luminous intensity of daylight to provide useful diffuse light for the interior of the building.

During the water treatment stage, the concentrated thermal radiation pasteurizes, disinfects, desalinates, and/or virally inactivates the greywater. The flow rate of the greywater through the SEWR modules is dependent upon the amount of time that is required to inactivate the pathogens of the greywater at a specific temperature of the water. The amount of time that is required to inactivate pathogens at specific water temperatures is a known quantity. According to one embodiment of the invention, the SEWR system includes a temperature measurement apparatus, solenoid valves connected to the water transport conduits, and a computer processor. The computer processor contains instructions for operating the solenoid valves to achieve a desired flow rate of the water as a function of the measurement of the temperature measurement apparatus.

Following the water treatment stage, the water undergoes additional treatment (see stage 4A) and/or the water is distributed to additional thermal applications (see stage 4B). During stage 4A, the water undergoes additional treatment processes, e.g., dissolved solids reduction or biological nutrient removal. The water is then delivered back to stage 1 and/or the water is delivered to thermal applications or points of use at stage 4B.

During stage 4B, the water is delivered to one or more thermal applications (e.g., thermal storage, absorption cooling, domestic hot water, radiant heating) or points of use (e.g., faucets, baths, kitchen, cooling systems, laundry, toilets). Following stage 4B, the greywater is delivered back to stage 1 where the greywater is again collected.

Figure 5:
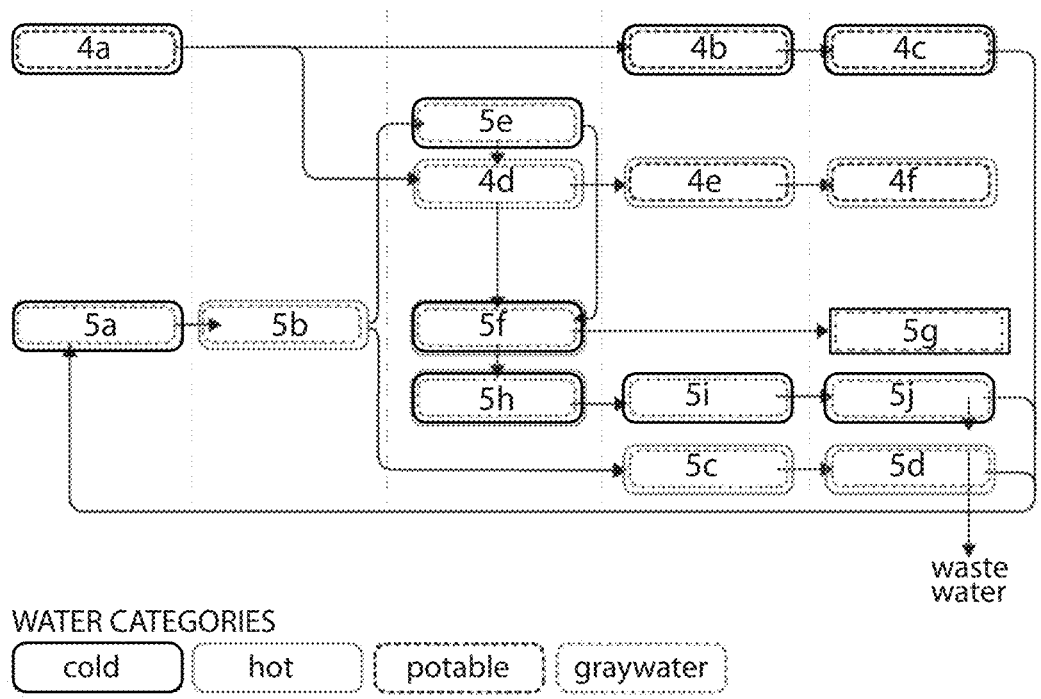
FIG. 5 is a diagram of hot and cold potable water flows and hot and cold greywater flows through a building, and the nature of the applicable end-uses of those water flows.
Figure 6:
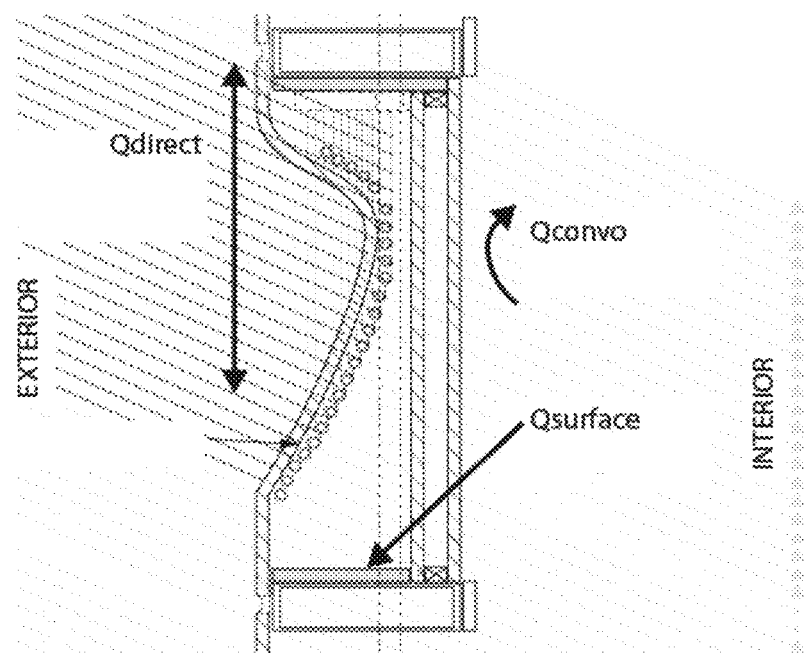
FIG. 6 is a cross-sectional view of an exemplary SEWR module.

FIG. 5 is a diagram of hot and cold potable water flows and hot and cold greywater flows through a building, and the nature of the applicable end-uses of those water flows. In FIG. 6, a local water main 4a distributes cold potable water 4b for potable consumption 4c or other uses such as faucets, baths, kitchen, personal hygiene, and laundry. The local water main 4a also distributes cold potable water to a heat exchanger 4d which heats the cold water. The heated potable water 4e is then distributed for potable consumption 4f or other uses such as faucets, baths, kitchen, personal hygiene, and laundry. An on-site water treatment facility 5a distributes cold greywater to an SEWR module 5b where the cold greywater is exposed to solar energy. As shown in FIG. 6, an exemplary SEWR module transfers thermal energy to the cold greywater (labeled Qdirect). Thermal energy is convected to the environment (labeled Qconvo) and thermal energy is incident upon the interior glass shelves of the SEWR module (labeled Qsurface).

Referring back to FIG. 5, the heated greywater 5c produced by the SEWR module of FIG. 6 is used for non-potable applications 5d, such as irrigation, toilets, laundry, vehicle cleaning, and cooling systems. The hot greywater is also distributed through an absorption chiller 5e and a heat exchanger 5f such that the thermal energy of the hot greywater is transferred to the cold potable water of the local water main 4a, thereby heating the cold potable water to produce hot potable water 4e for potable consumption 4f or other uses such as faucets, baths, kitchen, personal hygiene, and laundry. Transferring the thermal energy from the hot greywater to cold potable water provides an efficient way of utilizing the thermal energy that is generated by the SEWR module. The resulting cooled grey water 5c is then utilized for non-potable applications 5g such as radiant floor heating and cooling, irrigation, toilets, laundry, vehicle cleaning, and cooling systems. The heat exchanger 5f produces an overflow stream 5h in the form of cold gray water 5i that is used for non-potable applications 5j such as radiant floor heating and cooling, irrigation, toilets, laundry, vehicle cleaning, and cooling systems.

In a proof of concept, the solar absorption performance of a conventional flat-plate solar collector was compared with the solar absorption performance of an SEWR module having solar capture profile D3 (see FIG. 3). The conventional flat-plate solar collector had a single collector surface, whereas the SEWR module having solar capture profile D3 includes eight different collector surfaces. In the conventional flat-plate solar collector having a South facing tilt angle of 32 degrees, the total heat input for a 0.5 square meter collector area is 1,201.5 Watts. In contrast, in an SEWR module having solar capture profile D3, the heat input for a 0.01 square meter collector area is 750 Watts, the heat input for a 0.03 square meter collector area is 2252.4 Watts, the heat input for a 0.06 square meter collector area is 4692.5 Watts, and the heat input for a 0.12 square meter collector area is 9009.6 Watts.

Typical flat plate heat exchangers are capable of achieving water temperatures that are sufficient for space heating (60 degrees Celsius) and domestic hot water (40-50 degrees Celsius). In contrast, an SEWR module having solar capture profile D3 is capable of achieving water temperatures that are sufficient for absorptive cooling (90 degrees Celsius), space heating (60 degrees Celsius), water treatment (>60 degrees Celsius), and domestic hot water (40-50 degrees Celsius).

Figure 7A:
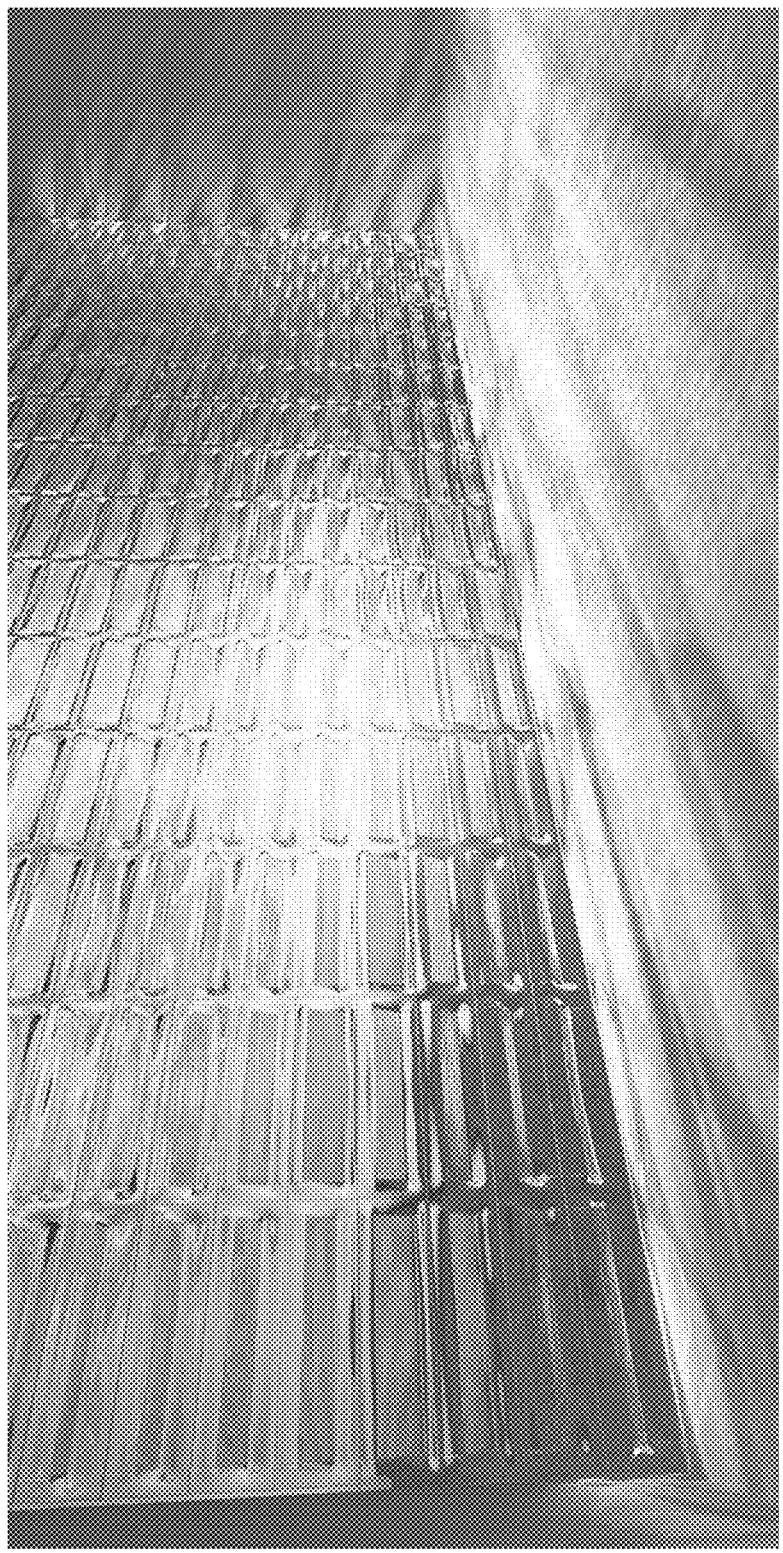
FIGS. 7A and 7B show exterior views of a wall populated with SEWR modules.
Figure 7B:

FIGS. 7A and 7B show exterior views of a wall populated with SEWR modules.

Figure 8:
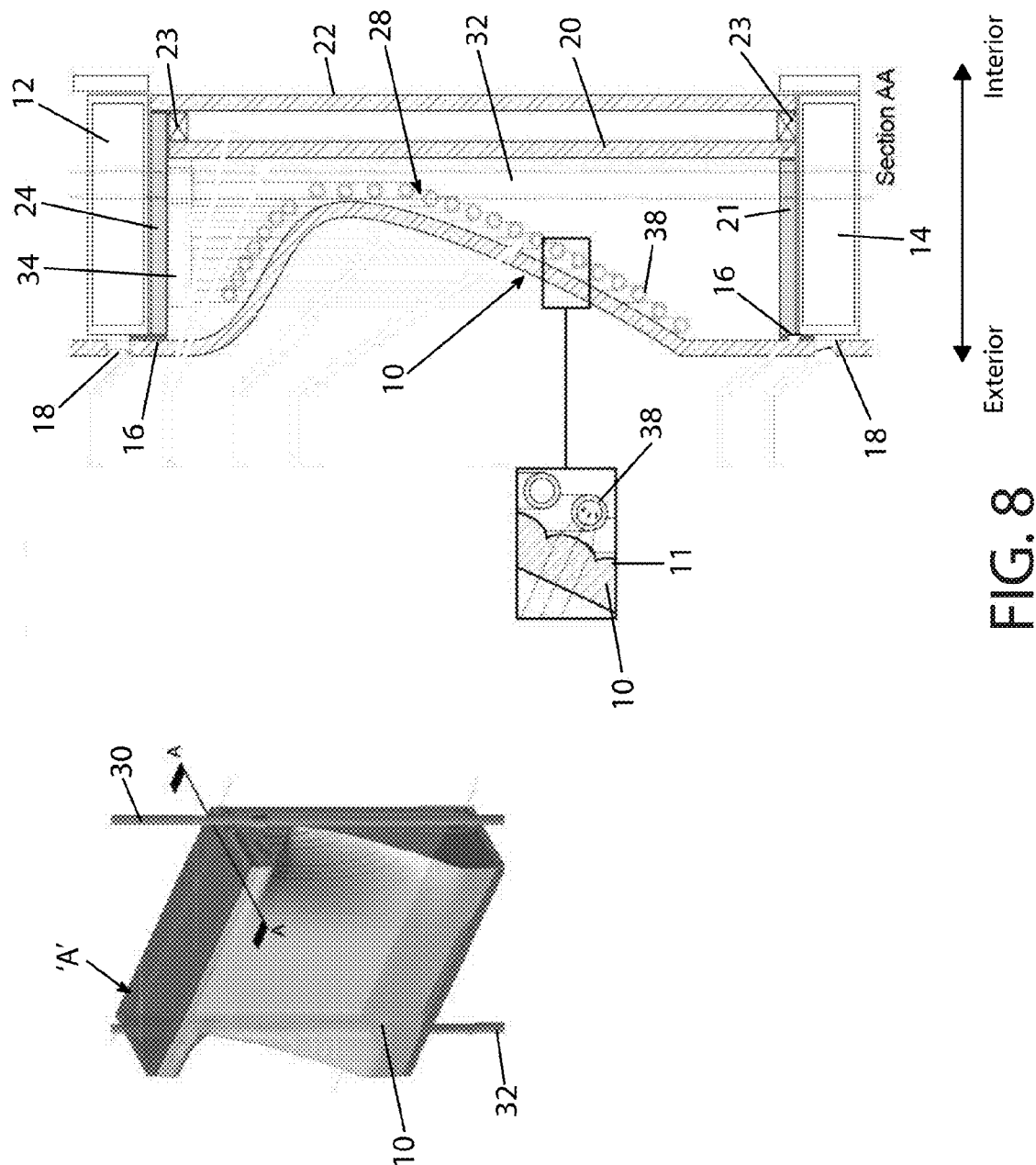
FIG. 8 depicts a perspective view, a detailed view and a cross-sectional view (taken along the lines A-A of the perspective view) of an SEWR module according to a first exemplary embodiment of the invention.

FIG. 8 depicts a perspective view, a detailed view and a cross-sectional view (taken along the lines A-A of the perspective view) of an SEWR module according to a first exemplary embodiment of the invention. The SEWR module is denoted by the letter 'A.' FIG. 9 is an exploded axonometric view of the SEWR module 'A' of FIG. 8.

Figure 9:
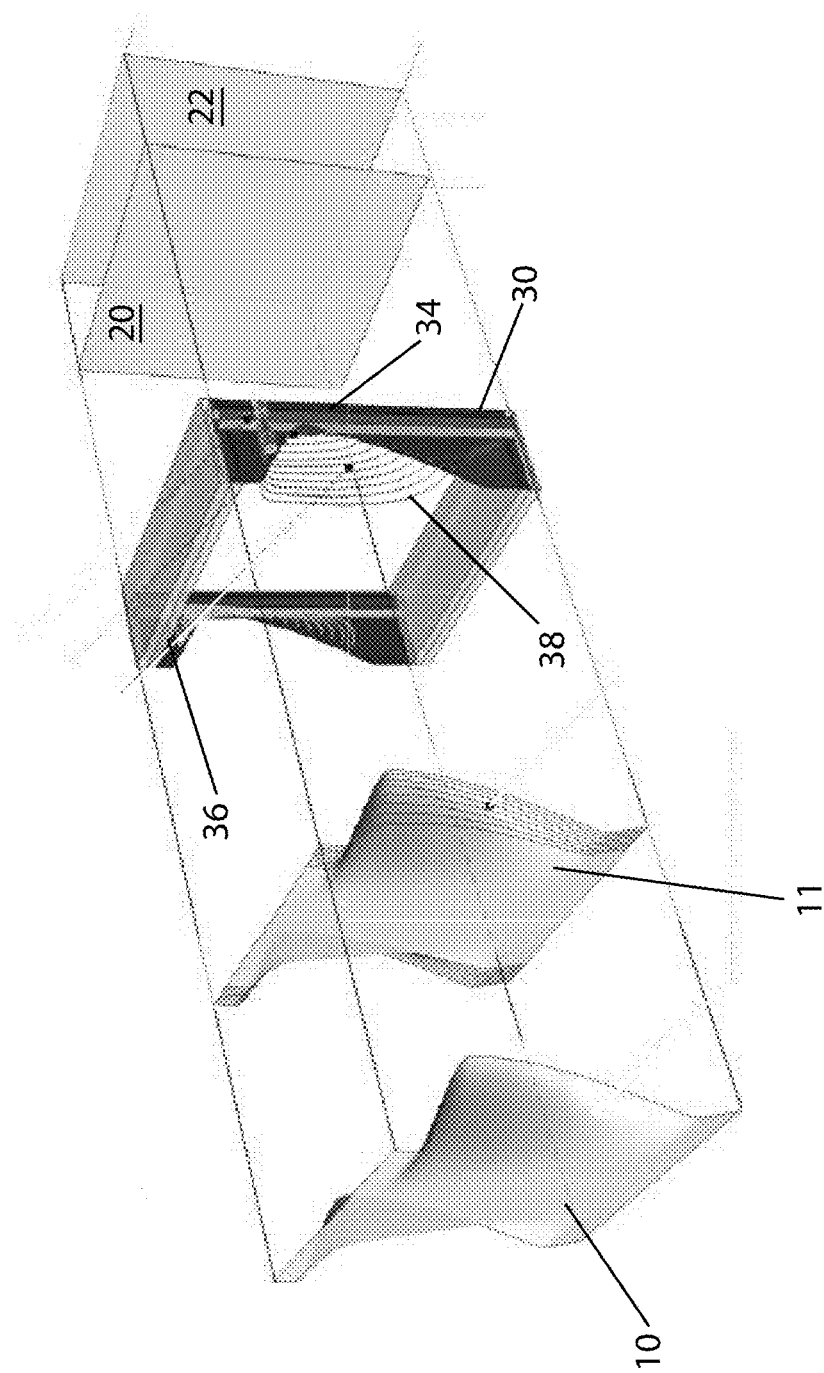
FIG. 9 is an exploded axonometric view of the SEWR module of FIG. 8.

The SEWR system of FIGS. 8 and 9 encompasses the following elements from FIG. 3: building typology A2, wall typology B1, SEWR module type C3, solar capture profile D3, concentration element E1, fabrication method F1, water transport method G1 and heat transfer assembly H2. It should be understood that those elements may vary without departing from the scope of spirit of the invention.

The SEWR module 'A' may be referred to herein as an Insulated Glazing Unit (IGU) because it includes multiple glass panes that define a dead space between those panes. More particularly, the SEWR module 'A' comprises an outer lens 10 (labeled 'solar profile'), which has a concave shape. The outer lens 10 faces the exterior of a building. As best shown in the detailed view of FIG. 8, a solar concentration element 11 is integrated on the interior facing surface of the outer lens 10. According to this exemplary embodiment, the solar concentration element 11 is provided in the form of a pillow lens (see concentration element E1 of FIG. 3) to achieve a solar concentration ratio that is greater than 1.

The outer lens 10 is mounted to two mullions 12, 14 that are spaced apart by a pre-defined vertical distance. The outer lens 10 is mounted to each mullion 12, 14 with a structural silicone 16. An elastic joint 18 couples the outer lens 10 of the SEWR module 'A' with adjacent SEWR modules (a portion of which are shown above and below the SEWR module 'A'). The elastic joint 18 accommodates thermal expansion, thermal contraction and vibration of the SEWR modules.

A first glass pane 20, which may be referred to as an IGU lite, is positioned interior to the outer lens 10 defining a space therebetween to accommodate a fluid transport assembly 28. The bottom end of the first glass pane 20 is separated from the bottom end of the outer lens 10 by a lower glass shelf 21. The lower glass shelf 21 is either positioned on or mounted to the top surface of the lower mullion 14. The lower glass shelf 21 separates the first glass pane 20 from the outer lens 10 by a pre-defined horizontal distance. The lower glass shelf 21 is mounted to the outer lens 10 by structural silicone 16 (or any other type of adhesive).

A second glass pane 22, which may also be referred to as an IGU lite, is positioned interior to the first glass pane 20 defining a space therebetween. A series of glass shelves 23 are positioned in the space defined between the first glass pane 20 and the second glass pane 22. The top end of the second glass pane 22 is separated from the top end of the outer lens 10 by an upper glass shelf 24. The upper glass shelf 24 is either positioned on or mounted to the lower surface of the upper mullion 12. The upper glass shelf 24 separates the second glass pane 22 from the outer lens 10 by a pre-defined horizontal distance. The upper glass shelf 24 is mounted to the outer lens 10 by structural silicone 16 (or any other type of adhesive).

The fluid transport assembly 28 directs greywater into and out of adjacent SEWR modules. According to this exemplary embodiment, the fluid transport assembly 28 sequentially delivers greywater to a series of SEWR modules that are arranged in a vertical column. The fluid transport assembly 28 comprises vertically extending fluid carrying conduits 30 and 32 that are positioned on either side of each SEWR module that is arranged in the vertical column.

The conduits 30 and 32 are fluidly coupled to each SEWR module to distribute the greywater through each SEWR module. More particularly, the conduits 30 and 32 are fluidly coupled to plenums 34 and 36 of SEWR module 'A' to distribute greywater to and/or from those plenums 34 and 36, respectively. The plenums 34 and 36 are hollow cylinders that are positioned within the interior of each SEWR module (including module 'A') directly beneath the upper glass shelf 24. A series of fluid carrying conduits 38 are fluidly coupled to each plenum 34 and 36 of SEWR module 'A.' Each conduit 38 is fluidly coupled to a plenum 34 or 36 to distribute greywater to and/or from that plenum 34 or 36.

As best shown in the detailed view of FIG. 8, the solar concentration element 11 concentrates solar rays onto each of the conduits 38, thereby heating the greywater that is contained within the conduits 38. The conduits 38 are positioned adjacent the solar concentration element 11 within the eight collector areas of the SEWR module 'A' (collector areas are shown in FIG. 8). Positioning the conduits 38 within the eight collector areas of the SEWR module 'A' maximizes the heat transfer between the concentrated solar energy and the greywater that is contained within the conduits 38. It should be understood that the orientation of the conduits 38 of a particular SEWR module will vary depending upon which cardinal direction the SEWR module faces once it is mounted to a building.

Figure 10:
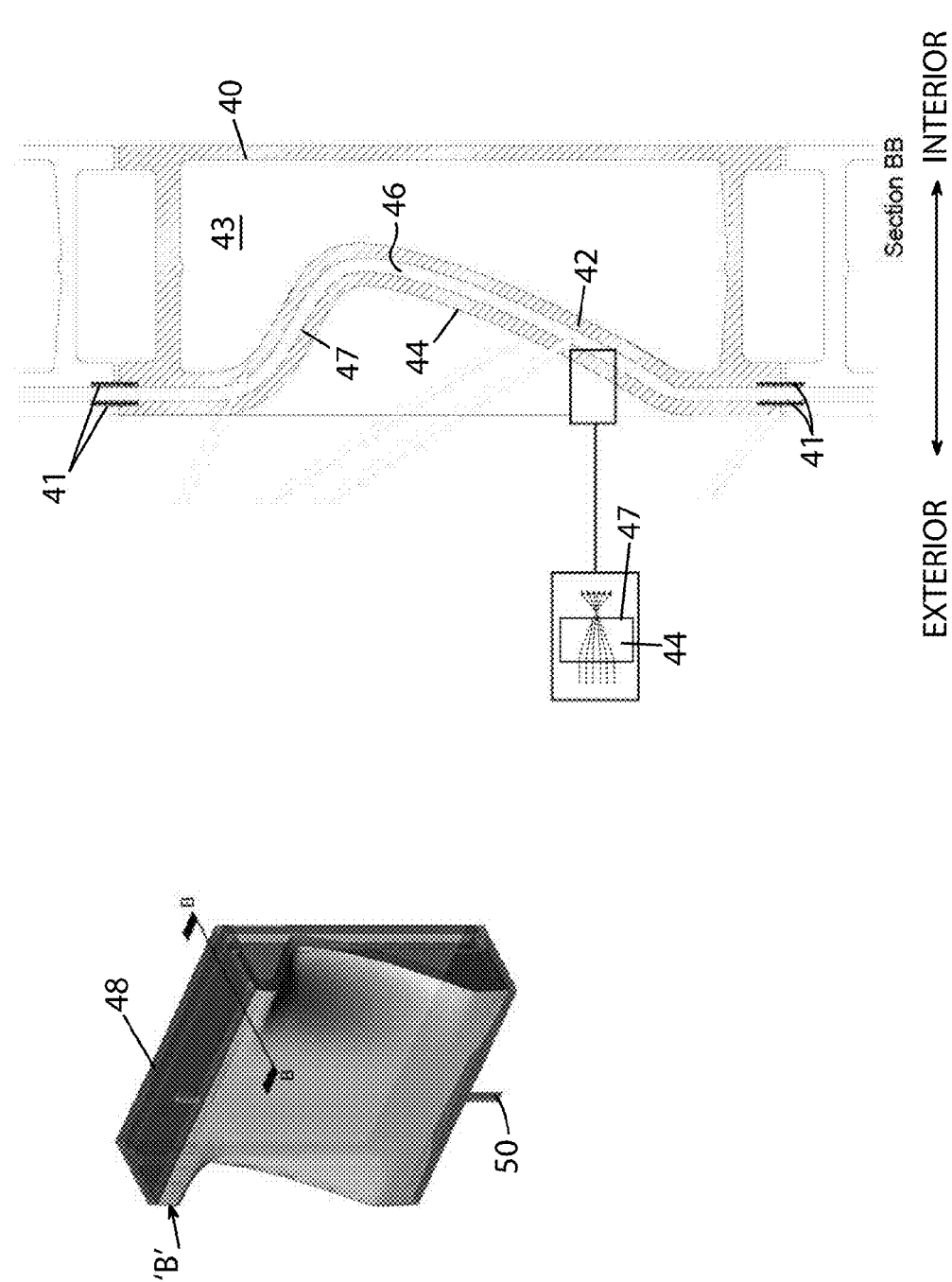
FIG. 10 depicts a perspective view, a detailed view and a cross-sectional view (taken along the lines B-B of the perspective view) of an SEWR module according to a second exemplary embodiment of the invention.

FIG. 10 depicts a perspective view, a detailed view and a cross-sectional view (taken along the lines B-B of the perspective view) of an SEWR module according to a second exemplary embodiment of the invention. The SEWR module is denoted by the letter 'B.'

Figure 11:
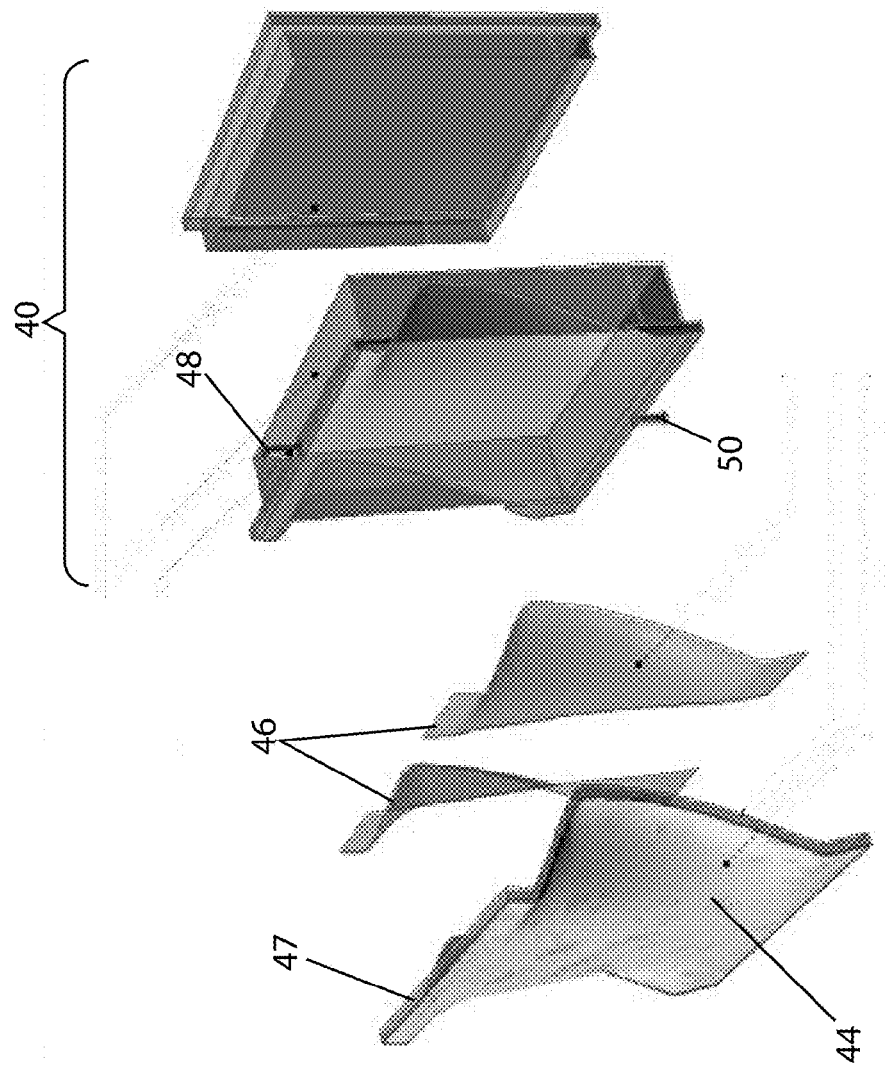
FIG. 11 is an exploded axonometric view of the SEWR module of FIG. 10.

FIG. 11 is an exploded axonometric view of the SEWR module of FIG. 10. The SEWR system of FIGS. 10 and 11 encompasses the following elements from FIG. 3: building typology A2, wall typology B2, SEWR module type C1, solar capture profile D3, concentration element E2, fabrication method F2, water transport method G2 and heat transfer assembly H4. It should be understood that those elements may vary without departing from the scope of spirit of the invention.

The SEWR module 'B' of FIGS. 10 and 11 is composed of a unitary, square-shaped glass block 40 that defines a hollow region 43. The glass block 40 is mounted above and/or beneath adjacent glass blocks by elastic gaskets 41 (a portion of which are shown in the cross-sectional view of FIG. 10).

An exterior facing surface 42 of the glass block 40 has a concave shape. An outer lens 44, which has a concave shape that is complimentary to the exterior facing surface 42, is positioned exterior to the exterior facing surface 42 of the glass block 40. The top and bottom surfaces of the outer lens 44 are mounted to the outer lenses of adjacent SEWR modules by elastic gaskets 41. Two symmetrical flow channels 46 are disposed between the exterior facing surface 42 of the glass block 40 and the interior surface of the outer lens 44. Greywater flows within the channels 46. Although not shown, the symmetrical flow channels 46 may be interconnected to form a single flow channel 46.

As best shown in the detailed view of FIG. 10, a solar concentration element 47 is integrated on the interior facing surface of the outer lens 44. According to this exemplary embodiment, the solar concentration element 47 is provided in the form of a GRIN film (see concentration element E2 of FIG. 3) to achieve a solar concentration ratio that is greater than 1.

The SEWR module 'B' of FIGS. 10 and 11 includes a fluid inlet port 48 for delivering greywater into the flow channels 46 and a fluid outlet port 50 through which the heated greywater is expelled. The fluid inlet port 48 may be positioned at the top end of the SEWR module 'B' (as shown) and the fluid outlet port 50 may be positioned on the bottom end of the SEWR module 'B' (as shown), or vice versa. According to one exemplary use of SEWR module 'B', greywater is distributed into the inlet port 48 from another SEWR module that is located above the SEWR module 'B.' The greywater flows downwardly through the flow channels 46 under gravity (while it is heated by solar energy). The heated greywater is expelled from the SEWR module 'B' through the fluid outlet port 50 and distributed to another SEWR module that is located beneath the SEWR module 'B.'

Figure 12:
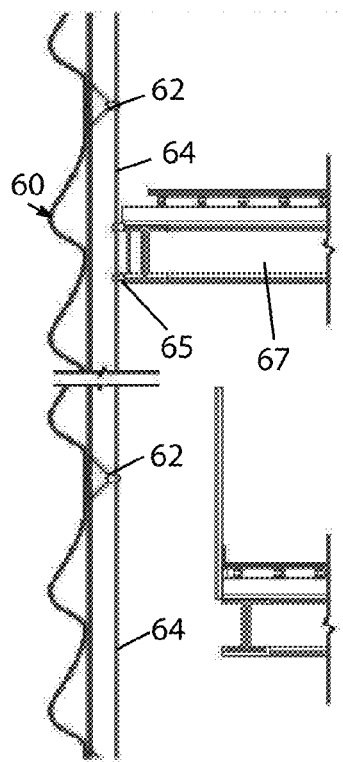
FIGS. 12-16 depict various wall assembly options for supporting the façade of an SEWR system.

FIGS. 12-16 depict various wall assembly options for supporting the façade of an SEWR system. Specifically, FIG. 12 depicts a cable net glazing wall assembly option for supporting the façade of an SEWR system 60. In the assembly of FIG. 12, the façade of the SEWR system 60 includes clamps 62 that are spaced along its length. The clamps 62 are fastened to structural cables 64 (one shown) that span the height dimension of the façade of the SEWR system 60. The cables 64 are also attached to clamps 65 that are attached to the infrastructure 67 of a building to mount the SEWR system 60 to the infrastructure 67 of the building. The SEWR system 60 of FIG. 12 encompasses the following elements from FIG. 3: building typology A1, wall typology B3, SEWR module type C4, solar capture profile D2, concentration element E2, fabrication method F2, water transport method G3 and heat transfer assembly H2. It should be understood that those elements may vary without departing from the scope of spirit of the invention.

Figure 13:
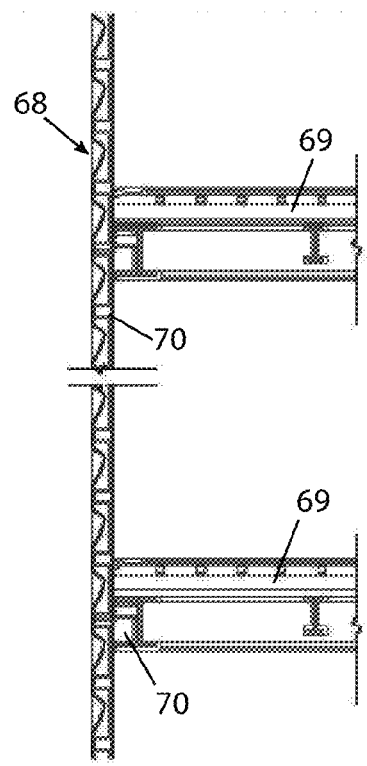

FIG. 13 is a hung block screen wall assembly option for supporting the façade of an SEWR system 68. A series of brackets 70 (one shown) that extend from the infrastructure 69 of a building are positioned between adjacent SEWR modules. The brackets 70 support the weight of the façade of the SEWR system 68. The SEWR system 68 of FIG. 13 encompasses the following elements from FIG. 3: building typology A1, wall typology B4, SEWR module type C1, solar capture profile D3, concentration element E1, fabrication method F1, water transport method G4 and heat transfer assembly H3. It should be understood that those elements may vary without departing from the scope of spirit of the invention.

Figure 14:
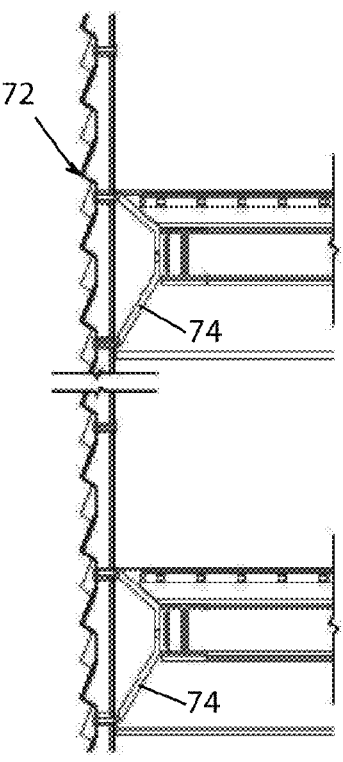

FIG. 14 is an Insulated Glazing Unit (IGU) wall assembly option for supporting the façade of an SEWR system 72. A series of brackets 74 (one shown), which extend from the infrastructure of a building, support the weight of the façade of the SEWR system 72. The SEWR system 72 of FIG. 14 encompasses the following elements from FIG. 3: building typology A1, wall typology B1, SEWR module type C4, solar capture profile D5, concentration element E4, fabrication method F1, water transport method G6 and heat transfer assembly H3. It should be understood that those elements may vary without departing from the scope of spirit of the invention.

Figure 15:
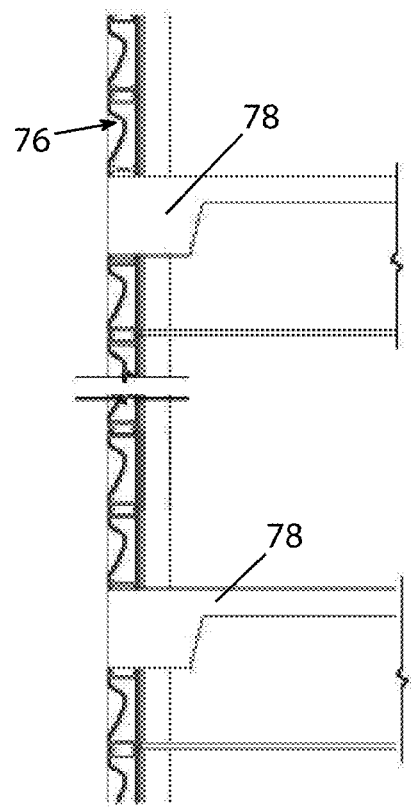

FIG. 15 is a glass block wall assembly option for supporting the façade of an SEWR system 76 in a load-bearing manner. The weight of the beams 78 (one shown) of the building infrastructure are supported by the SEWR modules of the SEWR system 76. The SEWR system 76 of FIG. 15 encompasses the following elements from FIG. 3: building typology A4, wall typology B2, SEWR module type C1, solar capture profile D3, concentration element E5, fabrication method F1, water transport method G5 and heat transfer assembly H2. It should be understood that those elements may vary without departing from the scope of spirit of the invention.

Figure 16:
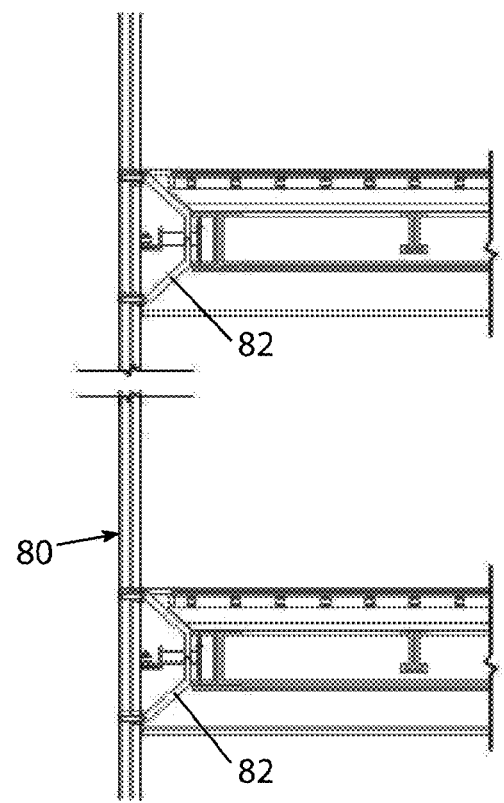

FIG. 16 is a standard curtain wall option for supporting the façade of an SEWR system 80. A series of brackets 82 (one shown) that extend from the infrastructure of a building are positioned between adjacent SEWR modules. The brackets 82 support the weight of the façade of the SEWR system 80. The SEWR system 80 of FIG. 16 encompasses the following elements from FIG. 3: building typology A1, wall typology B1, SEWR module type C5, concentration element E4, fabrication method F1, water transport method G6 and heat transfer assembly H2. It should be understood that those elements may vary without departing from the scope of spirit of the invention.

Figure 17:
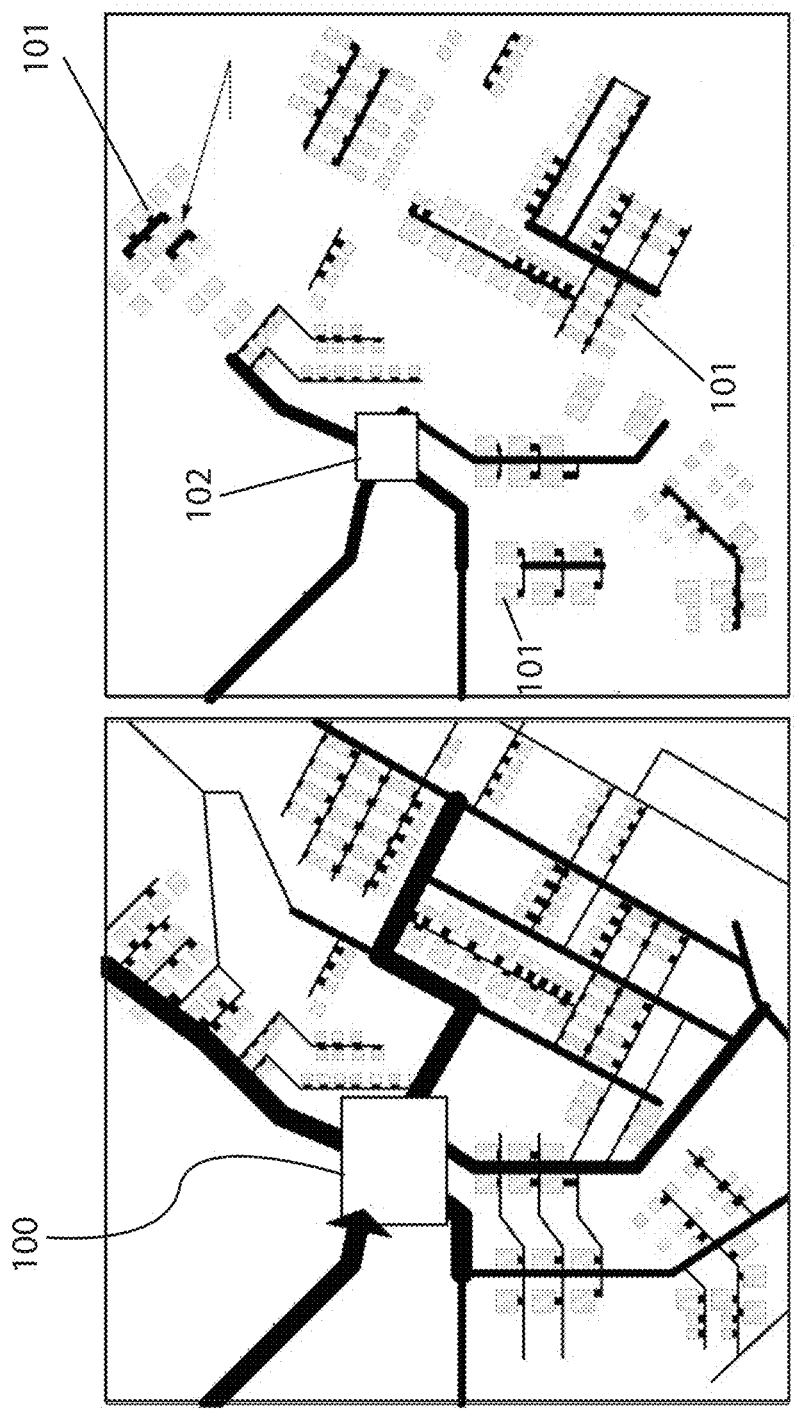
FIG. 17 depicts a conventional centralized water distribution network (see left rendering) and a decentralized water distribution network (see right rendering) for the purpose of comparison.

FIG. 17 depicts a conventional centralized water distribution network (see left rendering) and a decentralized water distribution network (see right rendering) for the purpose of comparison. In the conventional centralized water distribution network (shown to the left), a central water treatment plant 100 receives, treats and distributes wastewater to/from every building and residence in an urban area. All of the buildings and residences of the conventional centralized water distribution network are "on the grid."

Unlike the conventional centralized water distribution network, several buildings 101 of the decentralized water distribution network (shown to the right) include an SEWR system. Each building 101, or group of buildings 101, having an SEWR system operates as an "off-grid" water treatment center for the surrounding buildings and need not be connected to a central water treatment plant 102. By employing a decentralized water distribution network, municipalities can better manage water flows with smaller, decentralized distribution systems. The decentralized water distribution network reduces the length of transit from source to consumer, thereby reducing the energy required to distribute water and the potential for water loss through leakage.

Figure 18A:
FIGS. 18A and 18B depict a partially exploded view of a SEWR module (FIG. 18A) and the hourly location of incident sunrays on the SEWR module in the months of June (top), September and December (bottom), respectively.
Figure 18B:
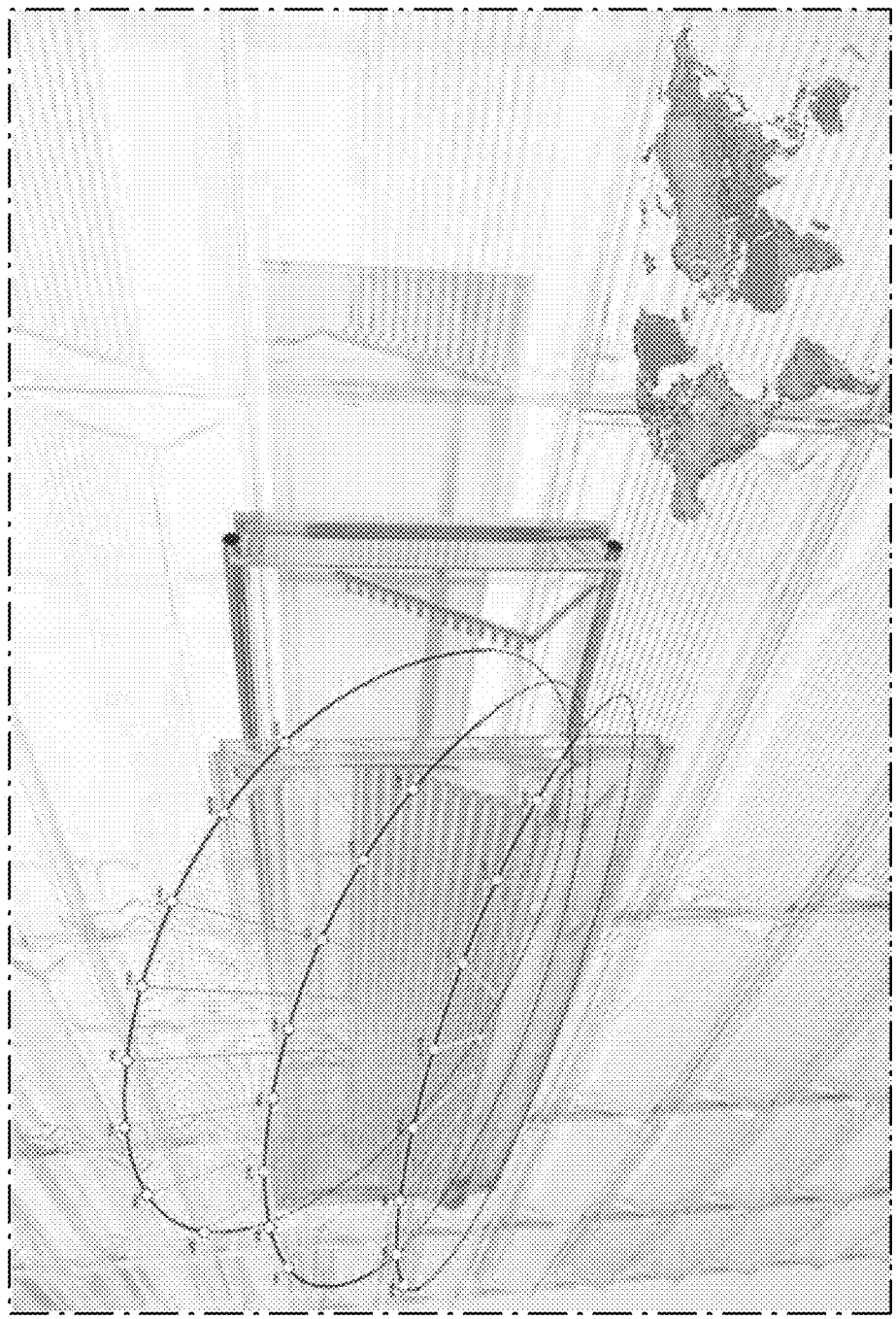

FIGS. 18A and 18B depict a partially exploded view of a SEWR module (FIG. 18A) and the hourly location of incident sunrays on the SEWR module in the months of June, September and December, respectively.

Figure 19A:
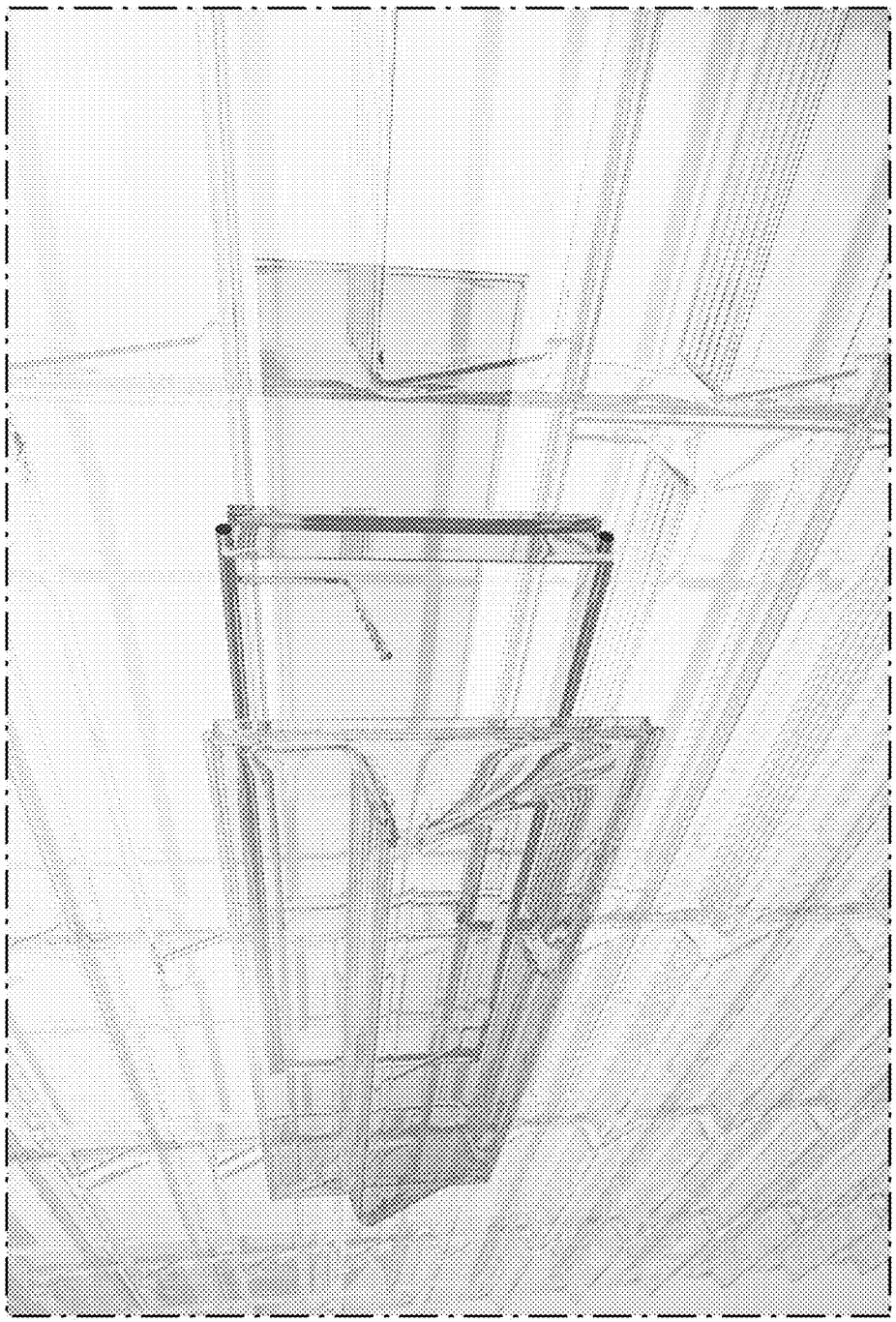
FIGS. 19A and 19B depict a partially exploded view of a SEWR module (FIG. 19A) and the hourly location of incident sunrays on the SEWR module in the months of June (top), September and December (bottom), respectively.
Figure 19B:
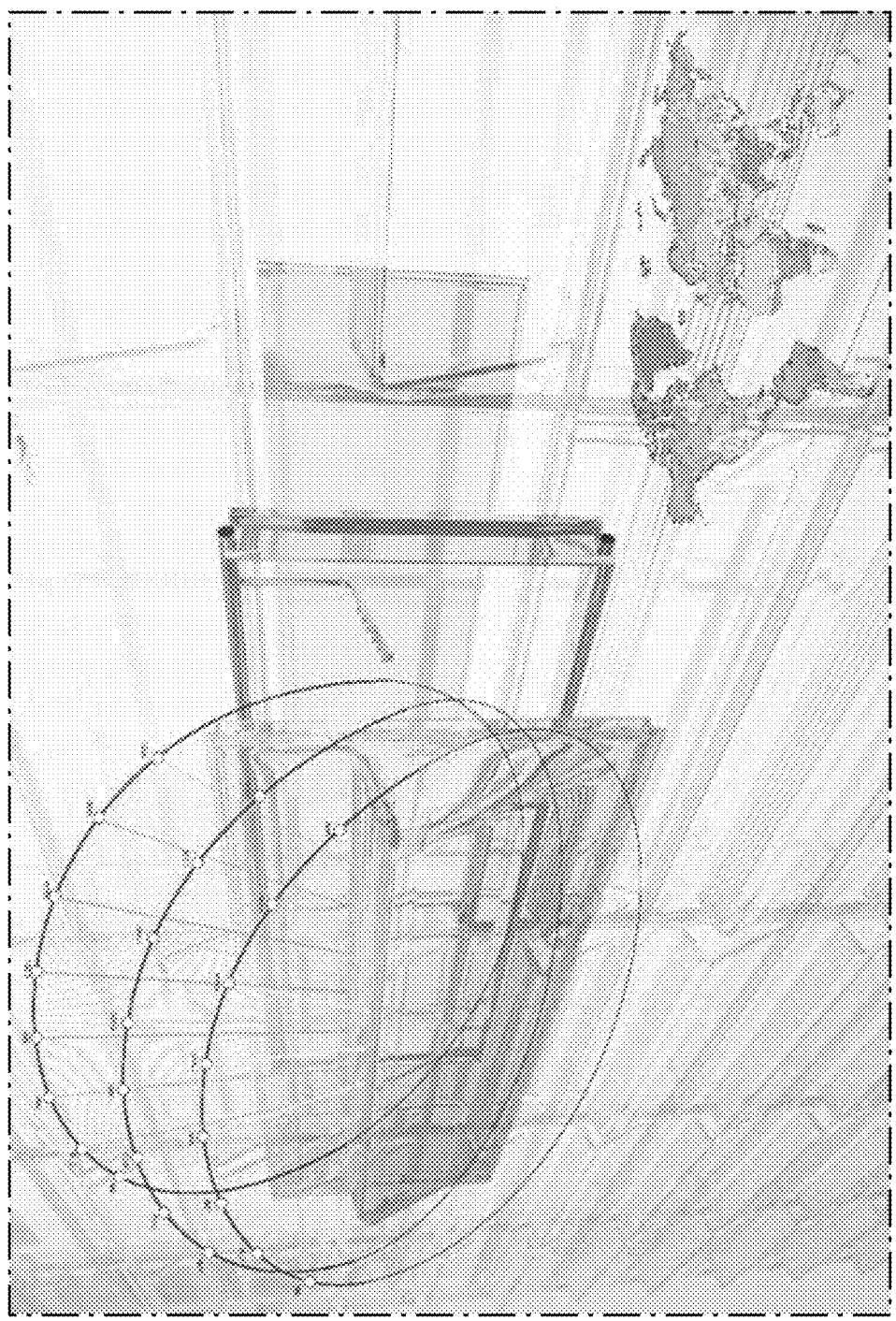

FIGS. 19A and 19B depict a partially exploded view of a SEWR module (FIG. 19A) and the hourly location of incident sunrays on the SEWR module in the months of June, September and December, respectively.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A system configured for treating wastewater using concentrated solar energy comprising a plurality of solar enclosure for water reuse (SEWR) modules that are fluidly connected by at least one wastewater conduit, each module including:
   a lens that is configured to form part of a façade of a building and pass sunlight into an interior of the building;
   a glass pane positioned opposite the lens that is configured to pass sunlight into the interior of the building; and
   a fluid passageway through which the wastewater is received from the at least one wastewater conduit and circulated through the SEWR module, said fluid passageway comprising a plurality of wastewater carrying tubes that are each positioned between the lens and the glass pane such that the plurality of wastewater carrying tubes are exposed to the sunlight that is passed through the lens,
   wherein the lens is configured to direct solar energy onto the wastewater within the plurality of wastewater carrying tubes to treat the wastewater.

2. The system of claim 1, wherein water treatment includes pasteurization, disinfection, desalination and/or viral/pathogenic inactivation of the wastewater.

3. The system of claim 1 further comprising a solar concentration element that is either positioned on or applied to the lens, wherein the solar concentration element increases incident solar acceptance angles of the lens to achieve a solar concentration ratio that is greater than one.

4. The system of claim 3, wherein the solar concentration element is selected from a group consisting of a pillow lens, a gradient index (GRIN) film, a compound parabolic concentrator, a fly's eye optic, a mosaic lens, a total internal reflecting (TIR) lens, and a thin film.

5. The system of claim 1, wherein at least a portion of the lens has a non-linear shape.

6. The system of claim 1, wherein the system facilitates the entry of natural light into an interior of the building.

7. The system of claim 1, wherein at least one of the wastewater carrying tubes is located at the focal point of the lens.

8. The system of claim 1, wherein the system is configured to receive a stream of wastewater from another building, treat the wastewater stream, and return the treated wastewater to said another building.

9. The system of claim 1 further comprising a glass module defining an evacuated interior region, wherein the lens is mounted adjacent the glass module, and wherein the glass pane forms part of the glass module.

10. The system of claim 1, wherein the system is passive such that it does not move to track sunlight.

11. The system of claim 1, wherein each SEWR module further comprises a wastewater manifold that is fluidly connected to the at least one wastewater conduit to receive wastewater from the at least one wastewater conduit and the wastewater manifold is also fluidly connected to the wastewater carrying tubes to distribute the wastewater into the wastewater carrying tubes.

12. The system of claim 1, wherein the plurality of SEWR modules are arranged in a vertical column.

13. A method of simultaneously treating wastewater that is circulated within a building, transporting heat energy and daylighting an interior of the building comprising the steps of:
   (a) distributing wastewater from a wastewater conduit and into a first solar enclosure for water reuse (SEWR) module;
   (b) circulating the wastewater through the first SEWR module that forms part of a façade of a building;
   (c) directing solar energy onto the wastewater contained within the first SEWR module to simultaneously treat the wastewater that is contained within the first SEWR module and daylight the interior of the building;
   (d) distributing the wastewater from the first SEWR module through the wastewater conduit and into a second SEWR module that also forms part of the façade of the building;
   (e) circulating the wastewater through the second SEWR module; and
   (f) directing solar energy onto the wastewater contained within the second SEWR module to simultaneously treat the wastewater that is contained within the second SEWR module and daylight the interior of the building;
   wherein each circulating step comprises directing the wastewater through a fluid passageway of a respective SEWR module, said fluid passageway comprising a plurality of wastewater carrying tubes that are each positioned between a lens and a glass pane of the respective SEWR module such that the wastewater carrying tubes are exposed to sunlight.

14. The method of claim 13, wherein water treatment includes pasteurization, disinfection, desalination and/or viral/pathogenic inactivation of the wastewater.

15. The method of claim 13 further comprising the step of distributing the treated wastewater and/or heat energy to water distribution points within the building.

16. The method of claim 13, wherein each directing step comprises directing solar energy through a lens that either at least partially encapsulates the fluid passageway or is positioned adjacent the fluid passageway.

17. The method of claim 16, wherein each directing step further comprises directing solar energy through a solar concentration element that is either positioned on or is applied to the lens, wherein the solar concentration element increases incident solar acceptance angles of the lens to achieve a solar concentration ratio that is greater than one.

18. The method of claim 13, wherein prior to step (a), the method further comprises the step of receiving a wastewater stream from another building.

19. The method of claim 18, wherein following step (f), the method further comprises the step of returning the treated wastewater and/or heat energy to said another building.

20. The method of claim 13, wherein the fluid passageway of each SEWR module further comprises a wastewater manifold that is fluidly connected to the wastewater conduit to receive wastewater from the wastewater conduit and the wastewater manifold is also fluidly connected to the wastewater carrying tubes to distribute the wastewater into the wastewater carrying tubes.

21. The method of claim 13, wherein the first and second SEWR modules are arranged in a vertical column.

* * * * *